(12) United States Patent
Iyer et al.

(10) Patent No.: US 11,347,293 B2
(45) Date of Patent: May 31, 2022

(54) MANAGEMENT OF TURBO STATES BASED UPON USER PRESENCE

(71) Applicant: Dell Products, L.P., Round Rock, TX (US)

(72) Inventors: Vivek Viswanathan Iyer, Austin, TX (US); Richard C. Thompson, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 143 days.

(21) Appl. No.: 16/578,024

(22) Filed: Sep. 20, 2019

(65) Prior Publication Data

US 2021/0089109 A1 Mar. 25, 2021

(51) Int. Cl.
*G06F 1/00* (2006.01)
*G06F 1/3231* (2019.01)
*H02J 7/04* (2006.01)
*G06F 9/38* (2018.01)
*G06F 1/3296* (2019.01)

(52) U.S. Cl.
CPC .......... *G06F 1/3231* (2013.01); *G06F 1/3296* (2013.01); *G06F 9/3877* (2013.01); *H02J 7/04* (2013.01)

(58) Field of Classification Search
CPC .... G06F 1/3231; G06F 9/3877; G06F 1/3296; H02J 7/04
See application file for complete search history.

(56) References Cited

U.S. PATENT DOCUMENTS

| | | | |
|---|---|---|---|
| 6,785,829 B1* | 8/2004 | George | G06F 1/3203 713/320 |
| 8,479,024 B2 | 7/2013 | Vichare et al. | |
| 9,197,092 B2 | 11/2015 | Verdun et al. | |
| 9,263,912 B2 | 2/2016 | Verdun et al. | |
| 9,831,700 B2 | 11/2017 | Verdun et al. | |
| 2004/0051708 A1* | 3/2004 | Hsu | G09G 3/3611 345/208 |
| 2009/0313490 A1* | 12/2009 | Tani | G06F 1/324 713/320 |
| 2010/0325451 A1* | 12/2010 | Chang | G06F 1/3296 713/502 |
| 2011/0258477 A1* | 10/2011 | Baker | G06F 1/3203 713/600 |
| 2011/0264938 A1* | 10/2011 | Henroid | G06F 1/3296 713/323 |
| 2012/0260057 A1* | 10/2012 | Eyerman | G06F 1/324 711/167 |
| 2017/0045866 A1* | 2/2017 | Hou | H04L 12/2825 |
| 2017/0066334 A1* | 3/2017 | Sindia | H02J 7/0088 |
| 2017/0371401 A1* | 12/2017 | Rotem | G06F 9/30145 |

(Continued)

OTHER PUBLICATIONS

Microsoft, "Power Management Functions," 10 pages, retrieved Jul. 10, 2019, available at https://docs.microsoft.com/en-us/windows/desktop/power/power-management-functions.

*Primary Examiner* — Xuxing Chen
(74) *Attorney, Agent, or Firm* — Fogarty LLP

(57) ABSTRACT

Embodiments of systems and methods for managing turbo states based upon user presence are described. In some embodiments, a method may include detecting, by an Information Handling System (IHS), a presence state of a user, and modifying a turbo configuration of a component of the IHS in response to the presence state.

9 Claims, 5 Drawing Sheets

(56) References Cited

U.S. PATENT DOCUMENTS

| | | | |
|---|---|---|---|
| 2019/0042310 A1* | 2/2019 | Browne | G06F 1/3209 |
| 2019/0196576 A1 | 6/2019 | Grobelny et al. | |
| 2020/0053651 A1* | 2/2020 | Lee | G06F 1/3231 |
| 2020/0150738 A1* | 5/2020 | Jull | G06F 1/3228 |

* cited by examiner

MANAGEMENT OF TURBO STATES BASED UPON USER PRESENCE

FIELD

The present disclosure relates generally to Information Handling Systems (IHSs), and more particularly, to systems and methods for managing turbo states based upon user presence.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In many implementations, modern IHSs include a feature called "dynamic overclocking," also known as "turbo mode" or simply "turbo." When turbo is invoked, an IHS automatically raises its processor's operating frequency, and thus its performance, in response to certain applications or tasks being executed. The processor's operating frequency is accelerated when an IHS's Operating System (OS) requests the highest performance state of that processor.

In some cases, when an IHS's workload calls for faster performance, a processor's clock increases its operating frequency in regular increments as required to meet demand. The increased clock rate is limited by the processor's power, current, and thermal limits, the number of cores currently in use, and the maximum frequency of the active cores. If any electrical or thermal limits are exceeded, the operating frequency is decreased in increments until the processor is again operating within its design limits.

As the inventors hereof have recognized, however, turbo puts stresses on an IHS's internal battery, whether the IHS is operating in AC and/or DC mode. Moreover, as turbo's maximum power draw has been consistently increasing over the years, it has caused even more stress on the batteries. To address these, and other problems, the inventors hereof have developed systems and methods for contextually mitigating battery stress by managing turbo states based upon user presence.

SUMMARY

Embodiments of systems and methods for managing turbo states based upon user presence are described. In an illustrative, non-limiting embodiment, a method may include detecting, by an Information Handling System (IHS), a presence state of a user; and modifying a turbo configuration of a component of the IHS in response to the presence state.

In some implementations, the presence state may be selected from the group consisting of: present and absent. Moreover, modifying the turbo configuration may include, in response to the user being present, enabling a maximum operating frequency for the component; and in response to the user being absent, disabling the maximum operating frequency for the component. In some cases, enabling the maximum operating frequency may include increasing an operating frequency. Additionally, or alternatively, enabling the maximum operating frequency may include allowing a battery of the IHS to sustain a draw spike. In other cases, disabling the maximum operating frequency may include spreading a turbo event over time. Spreading the turbo event over time may include maintaining a power draw under a capped value that prevents an internal battery of the IHS from sustaining a draw spike. Additionally, or alternatively, maintaining the power draw under the capped value may include maintaining a power consumption of the IHS under an alternating current (AC) adapter power level.

In other implementations, the presence state may be selected from the group consisting of: near-field, mid-field, and far-field. Modifying the turbo configuration of the component may include at least one of: selecting a first maximum turbo frequency in response to the user being in the near-field; selecting a second maximum turbo frequency smaller than the first maximum turbo frequency in response to the user being in the mid-field; or selecting a third maximum turbo frequency smaller than the second maximum turbo frequency in response to the user being in the far-field. Also, the component may be selected from the group consisting of: a Central Processing Unit (CPU), a Graphical Processing Unit (GPU), a Field Programmable Gate Array (FPGA), and a storage processor.

In another illustrative, non-limiting embodiment, an IHS may include a processor and a memory coupled to the processor, the memory having program instructions stored thereon that, upon execution by the processor, cause the IHS to: detect a presence state of a user; and modify a turbo state of the processor in response to the presence state. The presence state may be selected from the group consisting of: present and absent. To modify the turbo state, the program instructions, upon execution may cause the IHS to: in response to the user being present, increase a maximum turbo frequency; and in response to the user being absent, reduce the maximum turbo frequency.

To increase the maximum turbo frequency, the program instructions, upon execution, may cause the IHS to allow an internal battery to sustain a draw spike. Conversely, to reduce the maximum turbo frequency, the program instructions, upon execution, may cause the IHS to spread a turbo event over time. To spread the turbo event over time, the program instructions, upon execution, may cause the IHS to maintain a power draw under a capped value that prevents an internal battery of the IHS from sustaining the draw spike by maintaining a power consumption of the IHS under an AC adapter power level.

In yet another illustrative, non-limiting embodiment, a memory storage device may have program instructions stored thereon that, upon execution by one or more processors of an IHS, cause the IHS to: detect a presence state of a user; and modify a turbo state of the IHS in response to the presence state. The presence state may be selected from the group consisting of: near-field, mid-field, and far-field. To modify the turbo state the program instructions, upon execution, may cause the IHS to: select a first turbo frequency in response to the user being in the near-field; select a second turbo frequency smaller than the first turbo frequency in response to the user being in the mid-field; and select a third turbo frequency smaller than the second turbo frequency in response to the user being in the far field.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
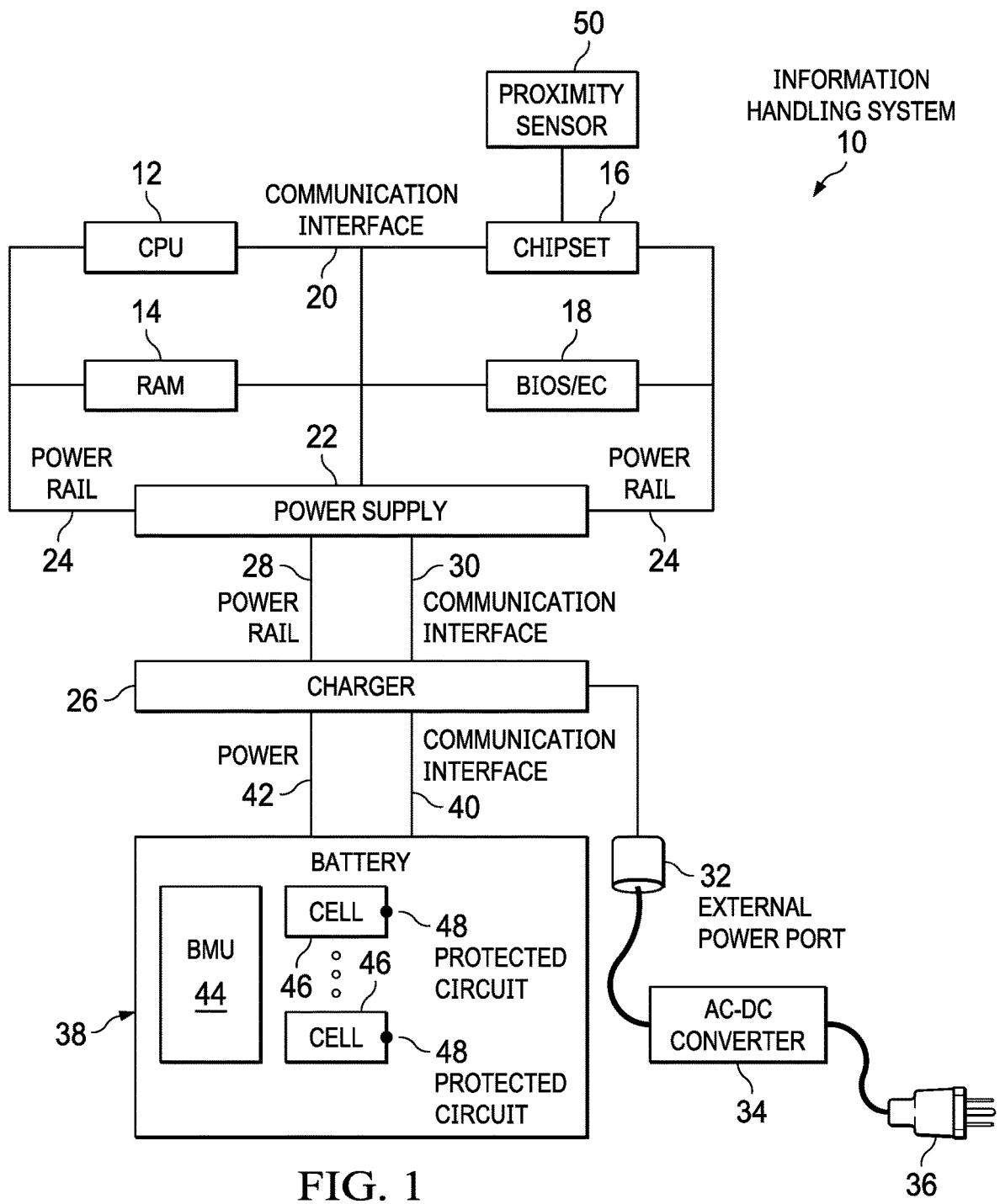
FIG. 1 is a block diagram an example of an Information Handling System (IHS) configured to managing turbo states based upon user presence, according to some embodiments.

In an Information Handling System (IHS), turbo mode, also known as "turbo," "dynamic overclocking" or "overclocking," kicks in during periods of heavy workload to rapidly perform processing operations with a corresponding increase in electrical current draw. Generally, an IHS's alternating current (AC) power supply adapts to current draw variations so that voltages at the processing components (e.g., CPU, GPU, FPGA, etc.) do not droop, by including capacitance that feeds additional current during periods of heavy workload. However, as processing components have increased in capabilities and power needs, the highest current draws can now exceed the capability of external power supplies to provide sufficient current.

When an IHS demands an amount of power that exceeds its AC adapter's capabilities, a Dynamic Battery Power Technology (DBPT) feature enables additional power draw from the IHS's internal battery. When DBPT is enabled during turbo modes of processor operation, the IHS's internal battery discharges to ensure adequate current is available. As such, DBPT and other similar features can result in snappy turbo performance and are desirable when a user is present before or near the IHS. When the user is absent, however, the use of turbo with DBPT can place an unnecessary electrical burden on the IHS's internal battery, causing the battery to be recharged more often and age faster.

An IHS may operate in one of various different power modes. Each power mode represents a different group of power settings. For example, an IHS may operate in three power modes: balanced, power saver, or performance. A balanced mode increases an IHSs processor speed when it needs it, and reduces it when it is not necessary. A power saver mode attempts to save power by reducing the processor's speed all the time and lowering screen brightness, among other settings. Meanwhile, a performance mode does not lower a processor's speed when it is not being used, running it at higher speeds most of the time (it may also increase screen brightness and prevent Wi-Fi or disk drives from entering power-saving modes).

As part of a contextual battery management operation, when the user is absent, an important use-case in AC mode is to mitigate and/or reduce battery stress; especially when the IHS goes into turbo mode and is in overall performance mode. In those cases, it may be desirable not to throttle in graded fashion but to avoid turbo altogether, and to hold sustained performance at peak level under the AC adapter's power level.

In some cases, a software service may determine that an IHS is operating in performance mode based upon the operating system's (OS's) settings, determine whether the user is present (e.g., near-field, mid-field, or far-field) or absent—along with other information—to contextually mitigate for battery stress in AC mode. For example, the software service may set maximum clock speed(s) and/or power levels for Central Processing Unit (CPUs), Graphical Processing Unit (GPUs), Field-Programmable Gate Arrays (FPGAs), storage processors, etc. These maximum power or clock values may be used to effectively spread turbo to maximum non-turbo clock values over longer time durations when user is absent (or at different distances from the IHS).

In some embodiments, a software service may implement a configuration policy that takes user presence or absence states as a binary input and enables or disables turbo as a binary output. In other implementations, maximum clock values or power levels may be selected in response to the user's physical distance from the IHS in a discrete (e.g., near, mid, or far-field) or continuous (e.g., inversely proportional to distance) fashion as part of a contextual battery optimization (CBM) engine.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Referring now to FIG. 1, a block diagram depicts IHS 10 configured to managing turbo states based upon user presence. In this example, CPU 12 executes instructions to process information, such as instructions of an OS (e.g., WINDOWS, MACOS, iOS, ANDROID, LINUX, etc.) or application. Random access memory (RAM) 14 stores the instructions and information, such as after retrieval from persistent storage of a hard disk drive or solid-state drive. Chipset 16 interfaces with CPU 12 to manage CPU operations, such as clock speed and power consumption. As an example, chipset 16 may include a Platform Controller Hub (PCH) that supports a processor turbo mode having increased clock speed and power consumption.

BIOS (Basic Input/Output System)/embedded controller (EC) 18 interface with CPU 12 and chipset 16 to coordinate power use and interactions with other physical components, such as networking, peripheral interfaces, etc. BIOS 18 instruction may be stored in a non-volatile memory accessible by chipset 16 via bus 20. Upon powering or restarting IHS 10, CPU 12 may utilize BIOS 18 instructions to initialize and test hardware components coupled to the IHS 10. BIOS 18 instructions may also load an OS for use by IHS 10.

Communication interface 20 provides communication between CPU 12, RAM 14, chipset 16 and BIOS/EC 18, and may include a variety communications links, such as PCI, PCI Express, I2C, SMBus and other wirelines and pins interfaced through a motherboard. In various embodiments, IHS 10 may include a variety of other hardware components, such as networking components, graphics components, an integrated display, etc.

IHS 10 includes power supply 22 that provides regulated power to processing components through one or more power rails 24. Power supply 22 maintains a selected voltage level on power rails 24 to within defined constraints for the processing components by adjusting current to the processing components as power demands shift. In various embodiments, one or more power supplies may feed current to different power rails that meet the constraints of different processing components, such as different rails that have different voltages.

In some embodiments, chipset 16 may interface with power supply 22 and/or EC 18 to communicate expected CPU processing bursts, such as when CPU 12 enters a turbo boost mode. Generally, proper operation of processing components calls for regulated voltage levels with varying current by IHS power supplies 22.

In this example, charger 26 interfaces with power supply 22 through power rail 28 and communication interface 30 to provide power from external power port 32 and/or internal IHS battery 38. During normal operation, charger 26 accepts power from an external power source, such as an AC-DC converter 34 and alternating current source 36 and provides the external power to power supply 22 to power processing components of IHS 10. Charger 26 uses excess power that is not drawn by power supply 22 to charge battery 38 through power interface 42 supported by a communication interface 40.

For example, battery 38 includes battery management unit (BMU) 44 that manages charge and discharge of individual battery cells 46, such as by metering current to battery cells 46. For instance, BMU 44 may include a controller configured to receive a command that sets a maximum charge current. In some embodiments, battery cells 46 are lithium ion battery cells with a nominal voltage of 3.7V that are coupled in series to operate at multiples of the nominal voltage.

Battery charge and protection are managed as a battery pack with individual battery cells 46 having charge parameters monitored by BMU 44 and battery protection enforced by isolating the battery pack in the event of a failure. In an alternative embodiment, each battery cell 46 has a protection circuit 48 that automatically disconnects the battery cell 46 in the event of a battery over voltage or over current event. As an example, battery 38 may include eight cells 46 configured in series and parallel to operate at a nominal voltage of 14.8V, and AC-DC converter 34 may provide current to charger 26 at the nominal voltage so that charger 26 directs power to battery 38 at the nominal voltage when excess power is available based on power supply 22 draw.

When CPU 12 initiates turbo mode with its associated increase in clock speed and current draw, external power port 32 cannot draw adequate power for power supply 22 to maintain voltage constraints of CPU 12 at the increased current draw. For instance, external power port 32 may be a USB Type C port that has a 100 W power limit, which is less than the maximum power draw of power supply 22. As another example, AC-DC converter 34 may lack power conversion sufficient to fully supply power supply 22 during peak power consumption.

In order to operate the processing components during peak power draw, power supply 22 simultaneously draws power from both external power port 32 and battery 38, such as with Dynamic Battery Peak Power (DBPT). When power supply 22 draws the maximum power available for external power port 32, battery 38 is allowed to discharge so that the combined power available from battery 38 and external power port 32 will meet the power demands of power supply 22. Again, in some cases, chipset 16 provides a signal to charger 26, power supply 22, and/or EC 18 to indicate that turbo mode is active.

As illustrated, chipset 16 may utilize a sensor hub or the like capable of sampling and/or collecting data from a variety of sensors. For instance, such a sensor hub may utilize proximity sensor(s) 50, including optical, infrared, and sonar sensors, that may be configured to provide an indication of a user's presence near IHS 100, absence from IHS 100, and/or distance from IHS 100 (e.g., near-field, mid-field, or far-field).

As illustrated, IHS 10 embodiments may utilize embedded controller (EC) 18 that may be a motherboard component of IHS 100 and may include one or more logic units. EC 18 may interface with BMU 18, and it may control maximum clock values, power states (p-state) manager for CPU, GPUs etc. through PECI (processor-to-EC) interface in run-time after initial settings are received from the BIOS (e.g., at boot up).

EC 18 may also implement operations for managing power for IHS 10. These operations may be utilized to determine the power status of IHS 10, such as whether IHS 10 is operating from battery power or is plugged into an AC power source (e.g., whether the IHS is operating in AC-only mode, DC-only mode, or AC—plus—DC mode).

In various embodiments, IHS 10 may not include each of the components shown in FIG. 1. Additionally, or alternatively, IHS 10 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
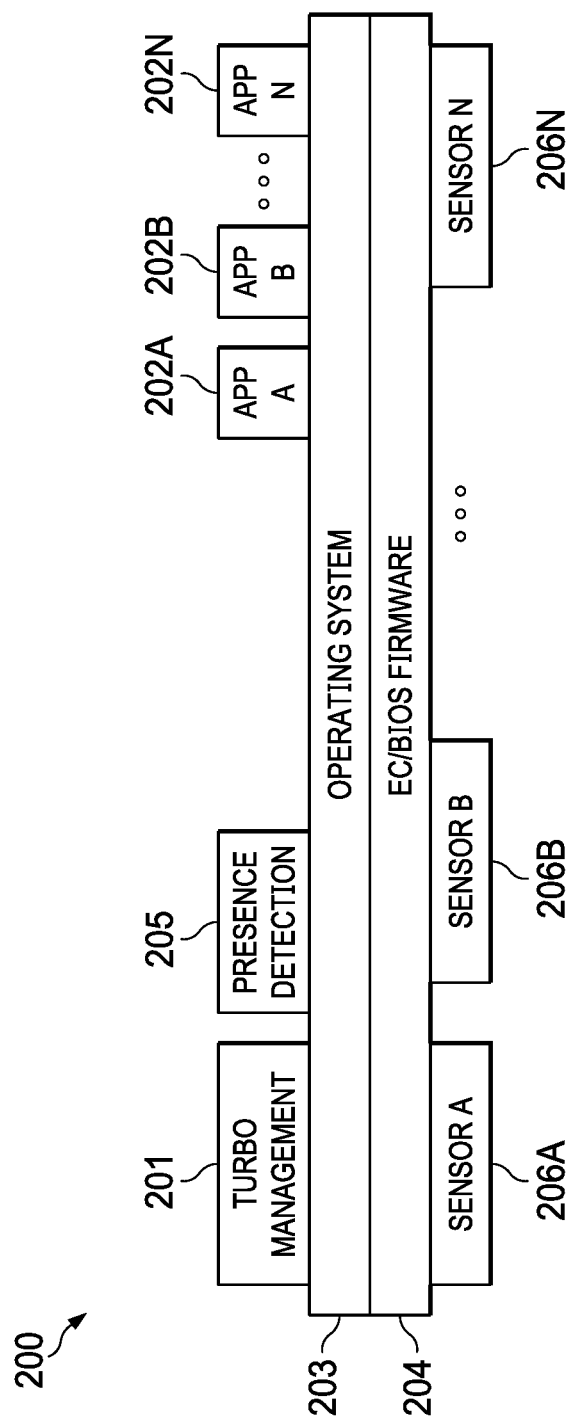
FIG. 2 is a block diagram illustrating an example of a software environment produced by an IHS for managing turbo states based upon user presence, according to some embodiments.

FIG. 2 is a block diagram illustrating an example of software environment 200 produced by IHS 10 for managing turbo states based upon user presence. In some embodiments, each element of software environment 200 may be provided by IHS 10 through the execution of program instructions by one or more logic components such as, for example, CPU 12 or EC 18, stored in memory (e.g., RAM 14), storage device(s), and/or firmware.

As shown, software environment 200 includes turbo management engine 201 configured to manage turbo states during execution of applications 202A-N. Examples of applications 202A-N include, but are not limited to, computing resource-intensive applications such as ADOBE ILLUSTRATOR, ADOBE AFTER EFFECTS, ADOBE MEDIA ENCODER, ADOBE PHOTOSHOP, ADOBE PREMIER PRO, AUTODESK AUTOCAD, AVID MEDIA COMPOSER, ANSYS FLUENT, ANSYS WORKBENCH, SONAR CAKEWALK, and the like; as well as less resource-intensive applications, such as media players, web browsers, document processors, email clients, etc.

Both turbo management engine 201 and applications 202A-N may be executed by OS 203, supported by EC/BIOS instructions or firmware 204. EC/BIOS firmware 204 is in communications with, and configured to receive data collected by, sensor modules or drivers 208A-N—which may abstract and/or interface with proximity sensor(s) 50, for example. In other cases, however, turbo management engine 201 may be integrated into EC 18. In various embodiments, software environment 200 also includes presence detection module or application programming interface (API) 205 executed above OS 203.

In some implementations, presence detection module 205 may process user presence data received by one or more of sensor modules 208A-N and it may determine, for example, whether an IHS's end-user is present or absent. Moreover, in cases where the end-user is present before the IHS, presence detection module 205 may further determine a distance of the end-user from the IHS continuously or at pre-determined time intervals. The detected or calculated distances may be used by presence detection module 205 to classify the user as being in the IHS's near-field (user's position<threshold distance A), mid-field (threshold distance A<user's position<threshold distance B, where B>A), or far-field (user's position>threshold distance C, where C>B).

In some cases, each distance may be associated with a different value by which a maximum clock frequency or power level is multiplied for a given IHS component, in order to reduce battery power draw. For example, if the user is in the near-field, the maximum clock frequency may be 100% of the maximum clock frequency requested by the OS. If the user is in the mid-field, the maximum clock frequency may be 50% of the maximum clock frequency requested by the OS. If the user is in the far-field, the maximum clock frequency may be 25% of the maximum clock frequency requested by the OS. And if the user is absent, turbo may be disabled altogether.

In some cases, turbo management engine 201 may receive IHS context information using sensors 208A-N including one or more of, for example: user's presence state (e.g., present, near-field, mid-field, far-field, absent), lid state (e.g., of laptop), hinge angle (e.g., between a display portion and a keyboard portion of the IHS), IHS movement (e.g. from an accelerometer or gyroscopic sensor), software application(s) under execution, and meeting/conference information obtained from a calendaring application executed by the IHS. Examples of meeting or conference information include, but are not limited to: a duration, a location, and/or the IHS's user's role (e.g., participant, presenter, manager, executive, etc.). Moreover, turbo management engine 201 may be configured to manage turbo states based upon (e.g., proportionally or in response to changes to) this and other contextual information.

Figure 3:
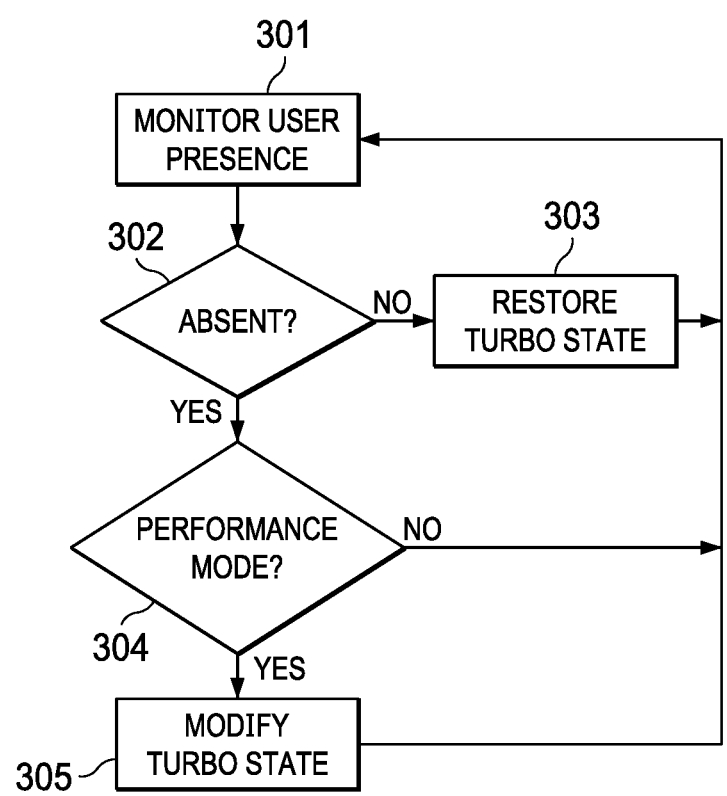
FIG. 3 is a flowchart illustrating an example of a method for managing turbo states based upon user presence, according to some embodiments.

FIG. 3 is a flowchart illustrating an example of a method for managing turbo states based upon user presence 300. In some embodiments, method 300 may be performed by turbo management engine 201 under execution by CPU 12 and/or EC 18. Particularly, at block 301, method 300 may monitor user presence continuously or at pre-determined time intervals.

At block 302, method 300 may determine the user's presence state—e.g., in this case, whether the user is absent. For example, block 302 may employ an Integrated Sensor Hub (ISH) microdriver based on chipset 16 that determines user presence (e.g., with hysteresis or a lag value to prevent rapid changes or oscillations). If the user is present, control passes to block 303 where method 300 restores saved maximum power states (p-states) of the IHS's CPU, GPU, FPGA, etc; which essentially removes a previously set "turbo disable" feature from EC 18 during a time when the user was absent, thereby enabling turbo and/or increasing a maximum turbo, clock, operating frequency, and/or power state values for a selected IHS component. In some cases, enabling turbo also allows an internal battery of the IHS to sustain a draw spike.

Conversely, if block 303 determines that the user is absent, block 304 then determines whether the IHS is operating in performance mode. For example, block 304 may receive information from the OS regarding whether performance mode is currently enabled via PECI to EC 18. If the IHS is not operating in performance mode, control returns to block 301. However, if block 304 determines that the IHS is operating in performance mode, block 305 modifies the current turbo state.

For example, block 304 may read maximum turbo states from a configuration policy table or file to thereby disable turbo and/or decrease a maximum turbo, clock, operating frequency, and/or power state values for the IHS component, effectively spreading turbo over a selected time duration. Spreading the turbo event over time may include maintaining a power draw under a capped value that prevents an internal battery of the IHS from sustaining a draw spike. In turn, maintaining the power draw under the capped value may include maintaining a power consumption of the IHS under an AC adapter power level.

In embodiments where block 302 identifies a distance between the user and the IHS, block 305 may apply different maximum turbo, clock, and/or power state values depending upon whether the user is found in the IHS's near-field, mid-field, or far-field—that is, even when the user is present. For example, block 305 may select a first maximum turbo frequency in response to the user being in the near-field; a second maximum turbo frequency smaller than the first maximum turbo frequency in response to the user being in the mid-field; or a third maximum turbo frequency smaller than the second maximum turbo frequency in response to the user being in the far-field. In other implementations, the second maximum turbo frequency may be greater than the first maximum turbo frequency in response to the user being in the mid-field; or a third maximum turbo frequency may be greater than the second maximum turbo frequency in response to the user being in the far-field. Additionally, or alternatively, the aforementioned first, second, and third maximum turbo frequencies may be scaled up or down using multiplication factor(s) selected based upon to the IHS's context (e.g., directly proportional to an angle of a hinge between a display and a keyboard portion of an IHS) and/or battery level (e.g., smaller multiplication factor for smaller battery charge levels).

Figure 4A:
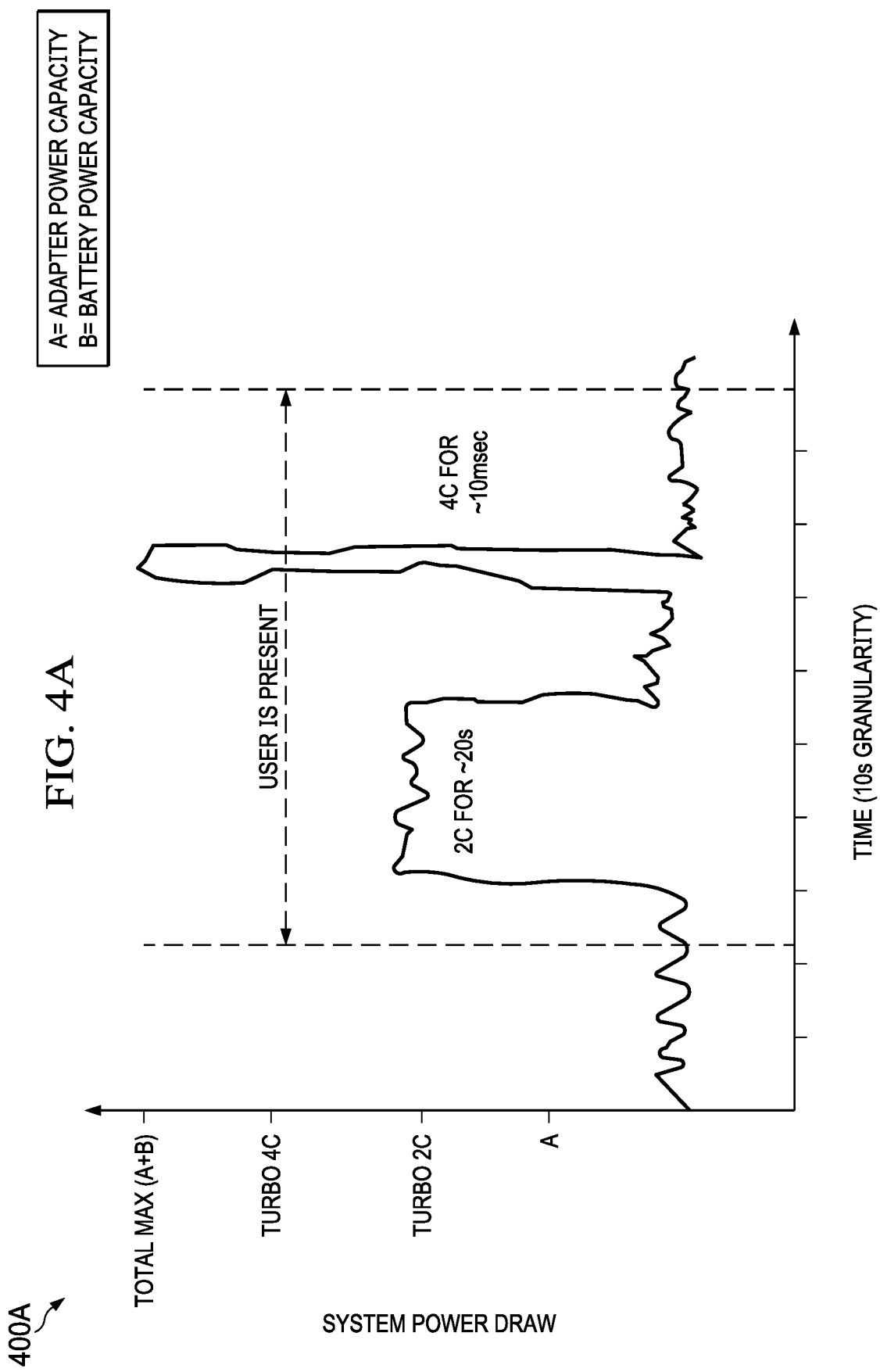
FIGS. 4A and 4B are charts illustrating examples of the application of a system and method for managing turbo states based upon user presence, according to some embodiments.
Figure 4B:
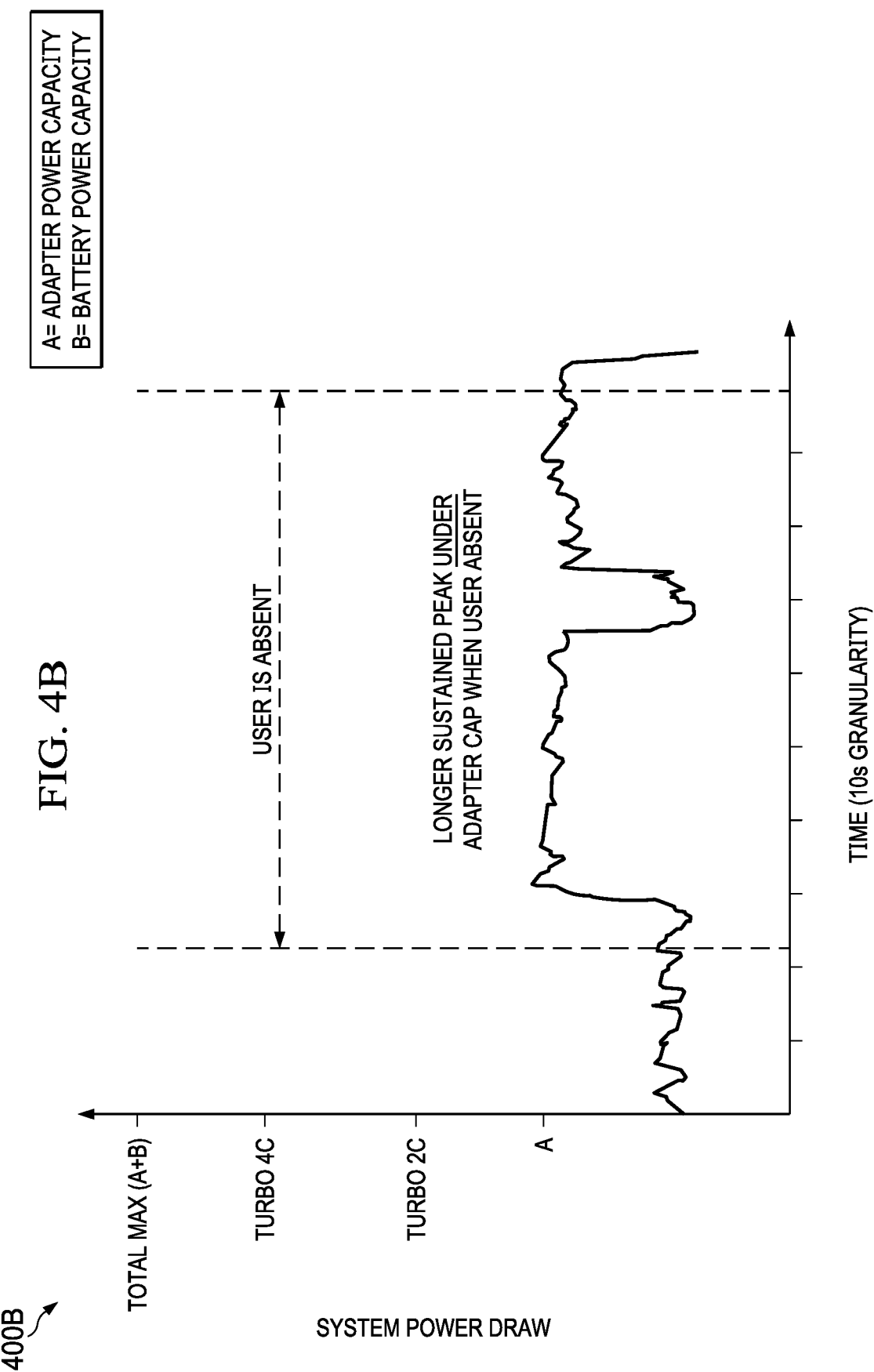

FIGS. 4A and 4B are charts illustrating examples of the application of a system and method for managing turbo states based upon user presence. Particularly, graph 400A shows the application of method 300 by system 200 when a user is present, whereas graph 400B shows the same scenario when the user is absent. For sake of illustration, in graphs 400A and 400B, available turbo states include "peak mode" and "sustained P max mode." Peak mode (4C) requires a 4× peak current rating for ~10 msec, and sustained P max mode (2C) requires 2× peak current rating for ~28 sec.

As shown on the left, in graph 400A (user present) the total system power draw uses all of the AC adapter power capacity (A) and some battery power capacity (B) both in 2C and 4C turbo modes. In contrast, using the systems and methods described herein, upon a determination that the user is absent (or farther away from the IHS) in graph 400B, the total system power is limited to the AC adapter power capacity (A) for a longer time duration, and the IHS component at issue is prevented from entering either 2C or 4C turbo modes.

In some implementations, turbo management engine 201 may use machine learning (ML) to improve the performance of applications 202A-N and/or to more effectively preserve the life of the IHSs internal battery. For example, ML may be used to determine a time duration for maximum AC adapter draw that makes up for the lack of turbo while the user is absent. If the user typically leaves the IHS alone at a certain time of day for a certain length of time (e.g. lunch, periodic meeting, etc.), the time that it usually takes for complete the execution of a given type of workload may be learned and recorded. In other cases, ML may be used to determine threshold distances for classifying the user as being in the near-, mid-, or far-field such that disabling turbo (or reducing turbo frequencies) does not impact the user's experience.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution by the processor, cause the IHS to:
   detect a presence state of a user;
   determine that the IHS is operating in performance mode; and
   in response to the determination and the presence state, modify a turbo state of the processor using a multiplication factor to scale a maximum turbo frequency up or down, wherein the multiplication factor is selected based upon at least one of: a hinge angle, or a battery level.

2. The IHS of claim 1, wherein the presence state is selected from the group consisting of: present, and absent.

3. The IHS of claim 2, wherein to modify the turbo state, the program instructions, upon execution, further cause the IHS to:
   in response to the user being present, increase the maximum turbo frequency; and
   in response to the user being absent, reduce the maximum turbo frequency.

4. The IHS of claim 3, wherein to increase the maximum turbo frequency, the program instructions, upon execution, further cause the IHS to allow an internal battery to sustain a draw spike.

5. The IHS of claim 3, wherein to reduce the maximum turbo frequency, the program instructions, upon execution, further cause the IHS to spread a turbo event over time.

6. The IHS of claim 5, wherein to spread the turbo event over time, the program instructions, upon execution, further cause the IHS to maintain a power draw under a capped value that prevents an internal battery of the IHS from sustaining the draw spike to keep a power consumption of the IHS under an alternating current (AC) adapter power level.

7. A non-transitory memory storage device having program instructions stored thereon that, upon execution by one or more processors of an Information Handling System (IHS), cause the IHS to:
  detect a presence state of a user selected from the group consisting of: near-field, mid-field, and far-field; and
  at least two of: (a) select a first turbo frequency in response to the user being in the near-field; (b) select a second turbo frequency greater than the first turbo frequency in response to the user being in the mid-field; or (c) select a third turbo frequency greater than the second turbo frequency in response to the user being in the far-field.

8. The memory storage device of claim 7, wherein the program instructions, upon execution, further cause the IHS to modify at least one of the first, second, or third turbo frequencies using a multiplication factor selected based upon context information.

9. The memory storage device of claim 8, wherein the context information comprises at least one of: a hinge angle, or a battery level.

\* \* \* \* \*